United States Patent [19]

Yamada et al.

[11] 4,050,717
[45] Sept. 27, 1977

[54] SEAT BELT SYSTEM

[75] Inventors: Makoto Yamada, Seto; Shiro Sasaki; Shigenori Kanazawa, both of Toyota; Yoshihiro Hayashi, Kasugai, all of Japan

[73] Assignees: Toyota Jidosha Kogyo Kabushiki Kaisha, Toyota; Nippon Denso Co., Ltd., Kariya; Tokai Rika Denki Seisakusho K.K., all of Japan

[21] Appl. No.: 674,491

[22] Filed: Apr. 7, 1976

[30] Foreign Application Priority Data

Apr. 25, 1975 Japan .................................. 50-51147

[51] Int. Cl.² ............................................ B60R 21/10
[52] U.S. Cl. .................................... 280/744; 280/747
[58] Field of Search ............... 280/744, 745, 746, 747; 242/107.4 R, 107.4 A

[56] References Cited

U.S. PATENT DOCUMENTS

| 3,854,749 | 12/1974 | Fieni | 280/745 |
| 3,856,327 | 12/1974 | Otani | 280/745 |
| 3,958,773 | 5/1976 | Sugar | 242/107.4 R |
| 3,977,696 | 8/1976 | Igeta | 280/744 |

Primary Examiner—Robert R. Song
Attorney, Agent, or Firm—Stevens, Davis, Miller & Mosher

[57] ABSTRACT

A lap belt take-up shaft for a seat belt retractor is arranged horizontally and substantially orthogonally to the traveling direction of a vehicle, whereby damage to the lap belt due to the drawing-out and rolling-in thereof is prevented and whereby a Vehicle Inertia Sensitive type emergency engagement device can be installed so as to demonstrate its function perfectly.

1 Claim, 4 Drawing Figures

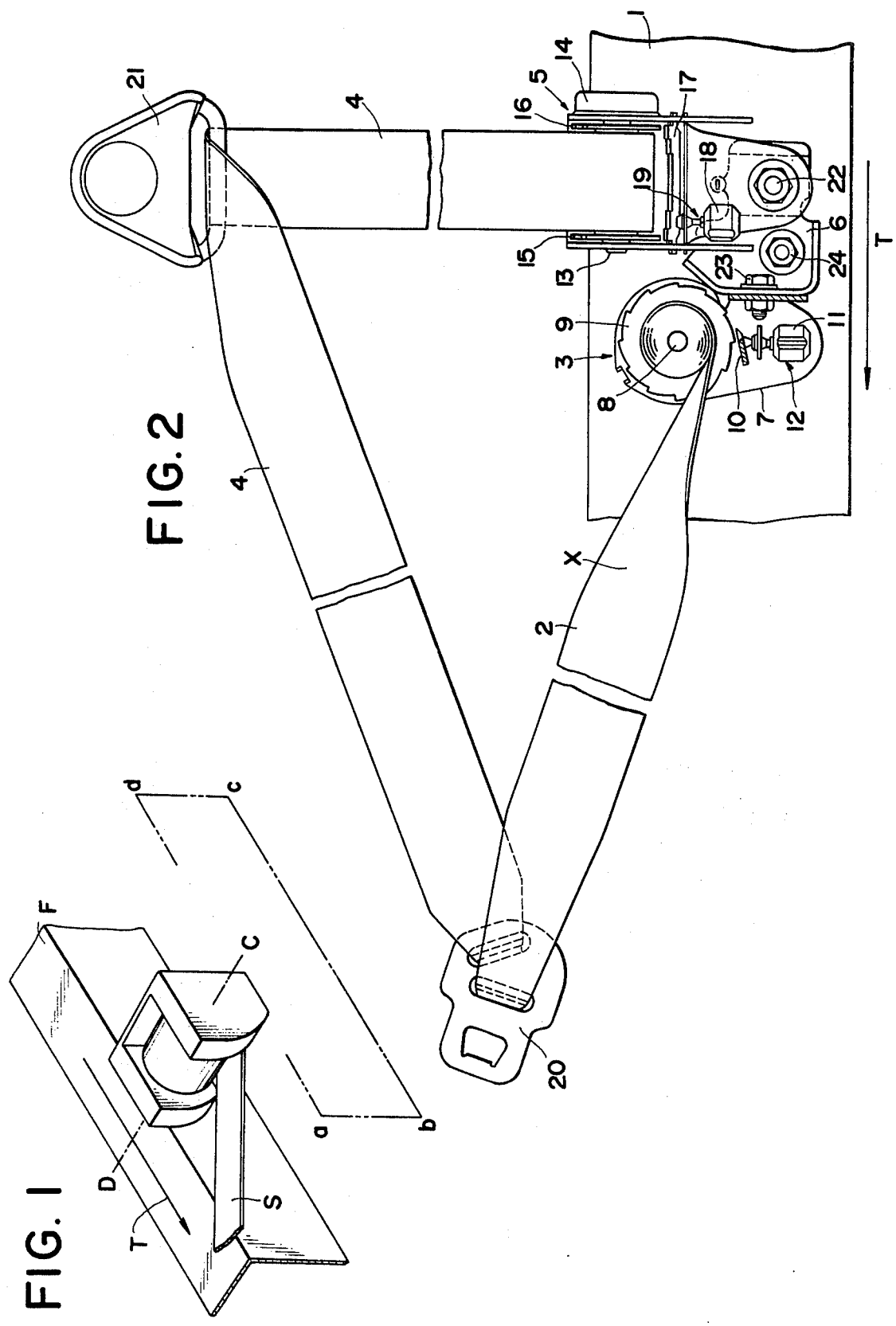

FIG. 3 Prior-art
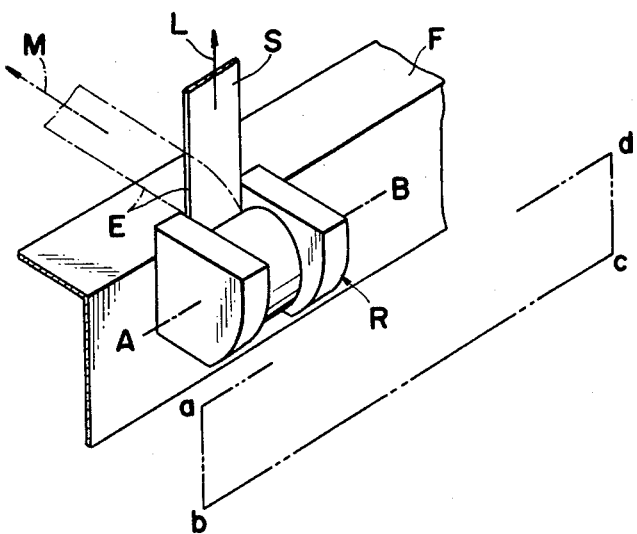
FIG. 4 Prior-art
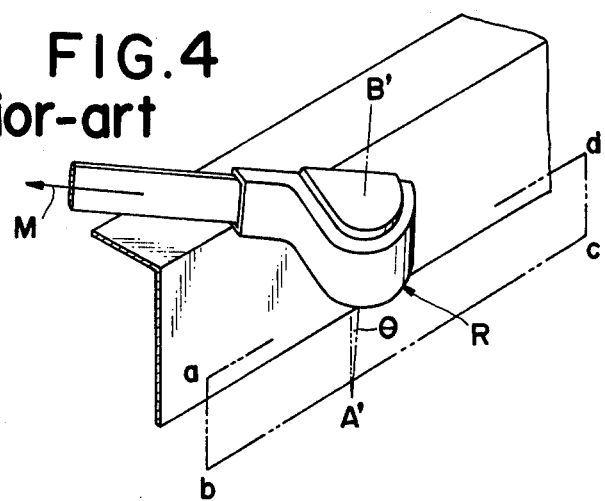

SEAT BELT SYSTEM

This invention relates to improvements in a seat belt system with which the seat of a vehicle is equipped.

Where a Vehicle Inertia Sensitive type emergency engagement device is used for a prior-art retractor of a lap seat belt in an automobile, it is horizontally mounted, as shown in FIG. 3, on a car body frame member F near the floor of the car in such a manner that the take-up axis A–B of the retractor extends in the traveling direction of the car, i.e., in parallel with the central longitudinal plane $a - b - c - d$ of the car.

For this reason, whereas the direction of drawing out the lap belt S is normal to the take-up axis A–B as indicated by an arrow L, the actual attachment of the belt is performed by drawing it out in a direction inclined to the axis A–B as indicated by an arrow M. The lap belt S develops side edge E which become conspicuously abraded due to repetition of the attachment. Another disadvantage is that it is difficult to draw it out smoothly. In order to eliminate these disadvantages, there has been proposed a structure in which, as shown in FIG. 4, the take-up axis A'–B' is orthogonal to the direction M of drawing out the lap belt, and it is parallel to the central longitudinal plane $a - b - c - d$ of the car and inclines by an angle $\theta$ with respect to the vertical line. With this structure, however, due to the inclination of the take-up axis A'–B', where the seat belt retractor R is additionally provided with the Vehicle Inertia Sensitive type emergency engagement device, the construction becomes complicated and the advantages cannot be fully utilized.

This invention has for its objects to control the friction and contact between the side edges of a lap belt and mounting means therefor when the lap belt is drawn out and rolled in and to thus prevent the belt from being damaged; to enable a Vehicle Inertia Sensitive type emergency engagement device, which is actuated by the Vehicle Inertia Sensitive parallel to the traveling direction of a car, to be installed in a state under which its advantage can be fully utilized; and to avoid any complicated structure.

Other features and advantages of the invention will be apparent from the following description taken in connection with the accompanying drawing wherein:

FIG. 1 is a perspective view showing the fundamental structure of the system of this invention, FIG. 2 is a side view, partly broken away, showing this invention in use, and FIGS. 3 and 4 are perspective views of the fundamental structures of prior-art systems.

As illustrated in FIG. 1, the system of this invention has the fundamental structure in which a take-up shaft for a lap belt S is mounted on a body frame member F near the floor of a vehicle in such a manner that the axis C–D of the take-up shaft intersects substantially orthogonally to the traveling direction T of the vehicle and that it is situated horizontally or intersects orthogonally to the central longitudinal plane $a - b - c - d$ of the vehicle.

FIG. 2 shows an example of this invention in use. It is a three-point type seat belt system equipped with two Vehicle Inertia Sensitive type emergency engagement devices, in which a retractor 3 for a lap belt 2 and a retractor 5 for a shoulder belt 4 are fixed to a car body frame member 1 close to the floor of the car through a bracket 6 and by bolts 24. The bracket 6 is coupled by bolts and nuts 22 and 23.

A take-up shaft 8 of the retractor 3 is mounted on the car body frame member 1 horizontally and substantially orthogonally to the traveling direction T of the car so that it is normally or always endowed with take-up energy by a spring interposed between the take-up shaft 8 and a retractor frame 7.

Ratchet wheels 9 are secured to both ends of the take-up shaft 8. A stopper pawl 10 which engages with the ratchet wheels to check the shaft 8 from turning in the direction of drawing of the belt is disposed for the Vehicle Inertia Sensitive type emergency engagement device 12 having a pendulum 11 of lead. Thus, when a G force due to, for example, the collision of the car is sensed, the lap belt 2 can be prevented from unrolling.

A take-up shaft 13 of the retractor 5 of the shoulder belt 4 is like, the take-up shaft 8, normally or always endowed with take-up energy by the elastic force of a spring contained in a spring case 14. It is mounted on the car body frame member 1 horizontally and in parallel with the traveling direction T of the car. Ratchet wheels 15 and 16 are secured to the take-up shaft 13 similarly to the foregoing. The Vehicle Inertia Sensitive type emergency engagement device 19 provided for the retractor 5 has pawl 17 engageable with the ratchet wheels 15 and 16 and a pendulum 18 made of lead. Thus, when a G force due to, for example, the collision of the car is sensed, the shoulder belt 4 can be prevented from unrolling. The Vehicle Inertia Sensitive type emergency engagement device includes, besides the pendulum system referred to above, a variety of systems such as a ball system and a stand weight system.

In FIG. 2, numeral 20 designates a tongue plate which is engaged with a buckle not shown. Numeral 21 indicates a guide ring for the shoulder belt 4 as secured to a shoulder belt anchorage arranged at an upper part of the car body.

The system of this invention has the construction as stated above. Since the take-up shaft 8 of the lap belt 2 of the seat belt is mounted on the car body frame member 1 horizontally and substantially orthogonally to the traveling direction T of the car, the direction in which the lap belt 2 is drawn out for the attachment is orthogonal to the take-up shaft 8 at any time even if the position of attachment differes because of different occupants. The belt may have a half turn at a portion X corresponding to the waist of the human body. It is therefore easily preventable that the side edges of the lap belt 2 slidingly contact the fittings of the mouting device when being drawn out.

Since the take-up shaft 8 is disposed horizontally and substantially orthogonally to the traveling direction T of the vehicle as described above, the Vehicle Inertia Sensitive emergency engagement device can be set in a normal or regular position so as to function perfectly.

The take-up shaft 13 of the shoulder belt 4 in the illustrated embodiment is arranged in the horizontal direction parallel to the traveling direction of the vehicle as in the prior-art system. Since, however, the belt 4 is drawn out vertically upwards and is turned over by the guide ring 21, it does not require the construction as in the mounting device 3.

The system of this invention is constructed and operated as set forth above. When the lap belt is drawn out or rolled in, the frictional contact between the side edges thereof and the mounting device can be prevented, so that the belt can be easily drawn out and damage to the belt can be prevented. Further, the Vehicle Inertia Sensitive type emergency engagement device can be conventionally installed.

What is claimed is:
1. A seat belt system comprising:
   a lap belt;
   a lap belt take-up device, said device including a vehicular speed-sensing type emergency lock retractor having a belt winding shaft mounted on a car body frame member horizontally and substantially orthogonal to the traveling direction of the vehicle, one end of said lap belt being connected to said shaft;
   a shoulder belt;
   a shoulder belt take-up device, this device including a vehicular speed-sensing type emergency lock retractor having a belt winding shaft mounted on a car body frame member horizontally and substantially in parallel with the traveling direction of the vehicle, one end of said shoulder belt being connected to said shaft of said shoulder belt take-up device;
   a guide ring, which is attached to a car body frame member in the vicinity of an outer shoulder of an occupant and through which said shoulder belt is inserted;
   a tongue plate, to which the other end of said lap belt is connected and the other end of said shoulder belt is also connected through said guide ring and which is disengageably engaged with a buckle member anchored to a car body frame member on a side opposite to the retractors with respect to a seat; and
   a retractor fixing bracket, which is substantially L-shaped, said lap belt and shoulder belt take-up devices being secured to respective arms of the L-shape and the bracket being secured to a car body frame member.

* * * * *